Feb. 9, 1971 F. M. MATHENY ET AL 3,561,092
GASKET TRACTOR
Filed March 21, 1969 2 Sheets-Sheet 1
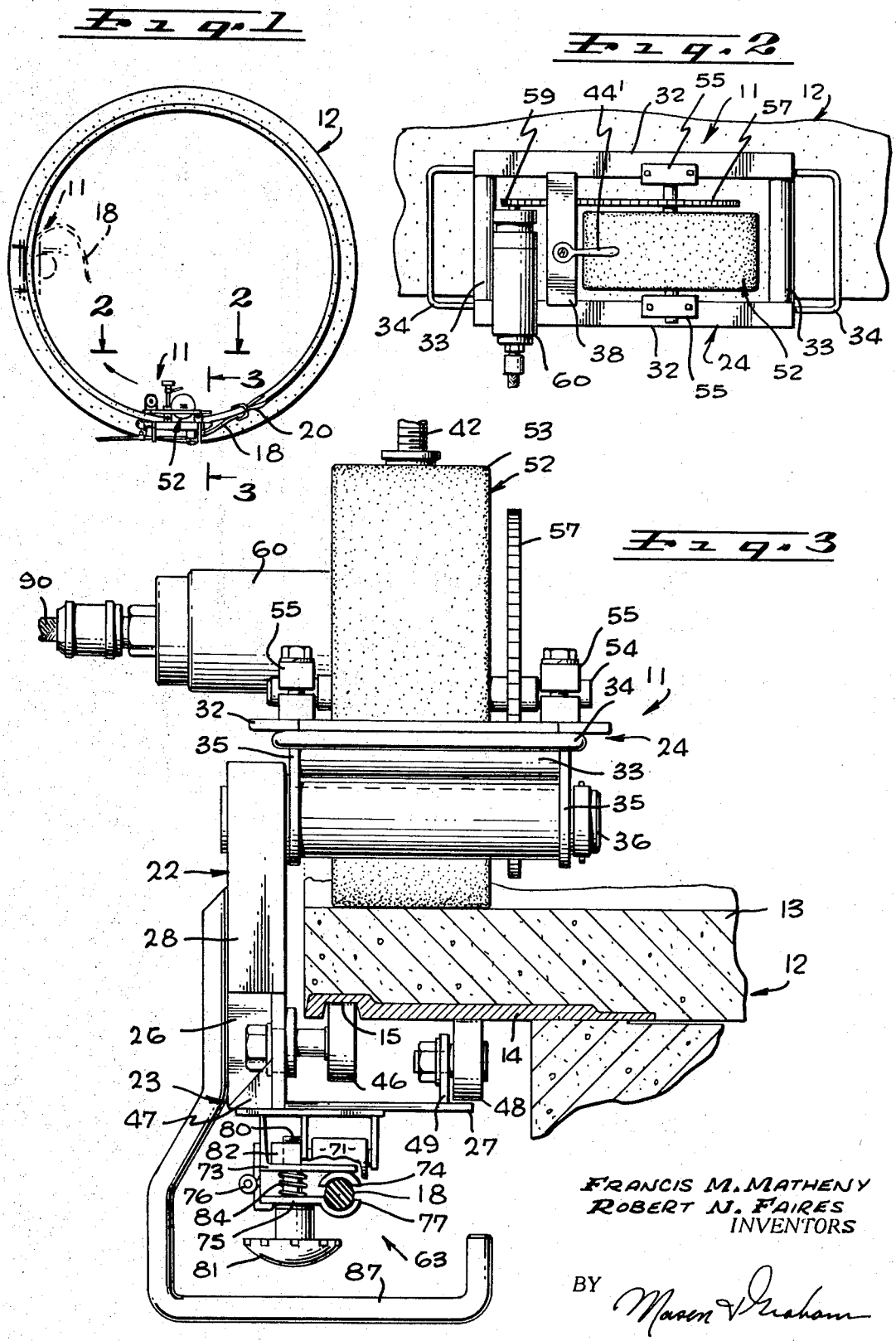
FRANCIS M. MATHENY
ROBERT N. FAIRES
INVENTORS
BY Mason & Graham
ATTORNEYS

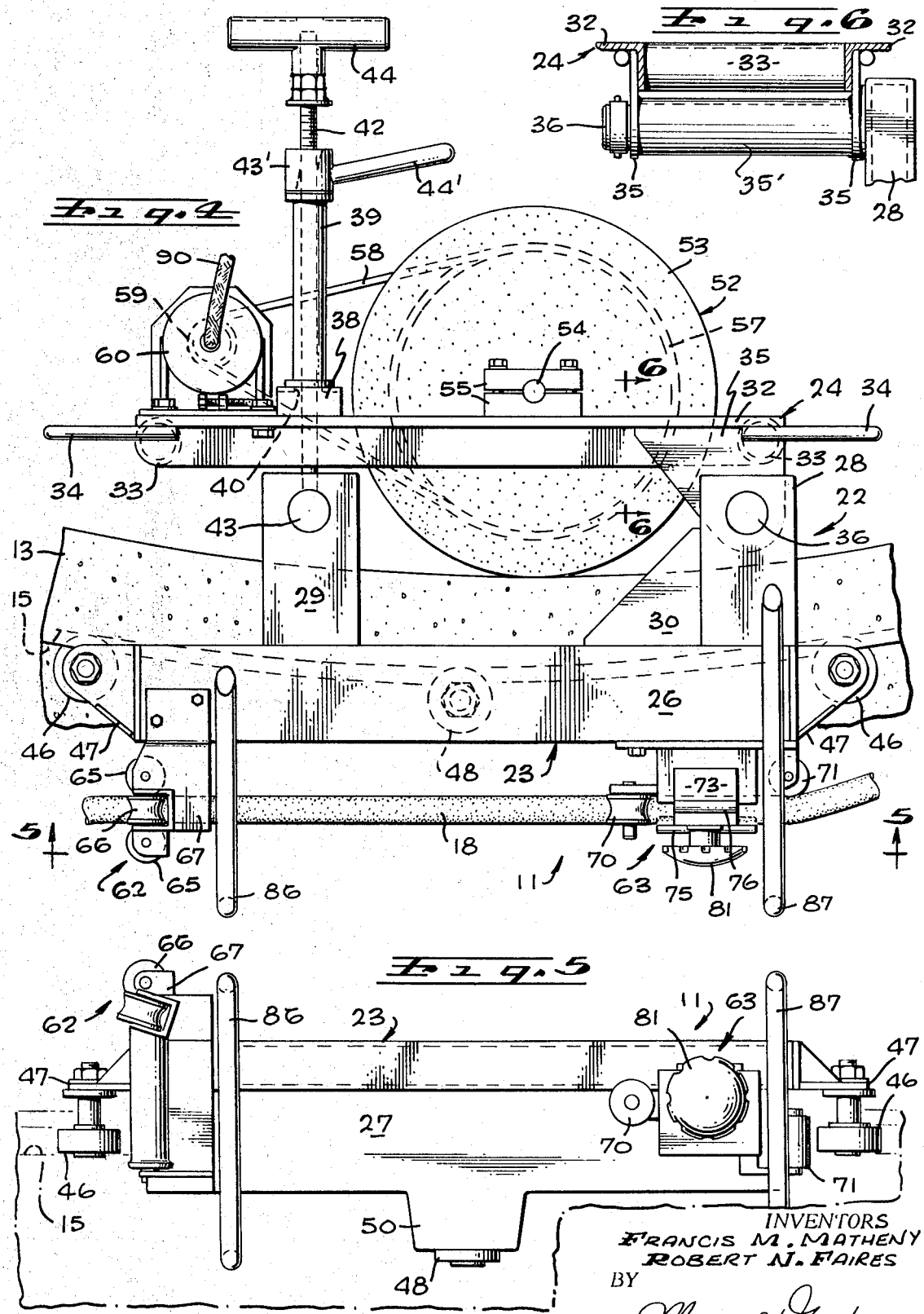

United States Patent Office 3,561,092
Patented Feb. 9, 1971

3,561,092
GASKET TRACTOR
Francis M. Matheny, Lynwood, and Robert N. Faires, Covina, Calif., assignors, by mesne assignments, to Ameron, Inc., Monterey Park, Calif., a corporation of California
Filed Mar. 21, 1969, Ser. No. 809,134
Int. Cl. B23p 19/02
U.S. Cl. 29—235                                     12 Claims

ABSTRACT OF THE DISCLOSURE

A device having a chassis with a motor-driven wheel adapted to engage the inner surface of a peripherally grooved spigot end portion of a large concrete pipe and with guide rollers adapted to engage the outer grooved surface of the spigot portion, together with means for guiding a gasket into place in the groove as the device travels circumferentially around the pipe.

---

The invention has to do generally with the art of installing resilient gaskets of rubber or the like on large diameter cylindrical members and more particularly with means for installing endless gaskets in the peripheral gasket groove of the spigot ring portion of large diameter concrete pipe preparatory to joining sections of the pipe in forming a pipe line.

Presently concrete pipe of extremely large diameter of the order of eighteen to twenty feet is used in water supply systems. The pipe sections are usually provided with an endless gasket of rubber, synthetic rubber, plastic, or the like on the spigot portion before the pipe sections are joined. Since it is normal practice to manufacture the pipe and accumulate a supply of pipe sections, there is usually a considerable period of time between the manufacture of a pipe section and the installation thereof in a pipe line. Consequently the gaskets are installed just prior to making up the pipe joints as otherwise they might deteriorate or be damaged in the field. The installation of the individual gaskets in each case entails considerable time and labor due to the large diameter of the pipe sections which makes it necessary for the men to work on ladders or other supports.

An object of the present invention is to provide a novel device capable of mechanically installing a gasket on the spigot ring portion of a large diameter concrete pipe section or the like quickly and with a minimum of labor.

More particularly it is an object to provide a self-propelled vehicle capable of being quickly mounted on the spigot portion of a pipe section and capable of travelling circumferentially around the pipe section and simultaneously guiding a packing ring into place in the external ring groove of the section.

In summary, the invention contemplates the provision of a machine having a chassis with a motor-driven wheel engageable with the inner surface of the spigot end portion of a pipe and guide wheel means or rollers engageable with the exterior surface including the ring groove together with means for guiding an endless gasket into place under tension into the groove.

These and other objects will be apparent from the drawings and the following description. Referring to the drawings:

FIG. 1 is an end elevational view of the pipe section showing the device of the invention mounted thereon, the view being somewhat diagrammatic.

FIG. 2 is a plan view of the device on line 2—2 of FIG. 1, but on a larger scale;

FIG. 3 is an end elevational view of the device and a sectional view on line 3—3 of FIG. 1, but on a larger scale;

FIG. 4 is a side elevational view of the device similar to FIG. 1, but on the same scale as FIG. 3;

FIG. 5 is an inverted plan view of the device on line 5—5 of FIG. 4; and

FIG. 6 is a fragmentary sectional view on line 6—6 of FIG. 4.

More particularly describing the invention, the device which has been termed a gasket tractor, is generally designated by numeral 11 and is shown in FIG. 1 mounted on a pipe section 12. The latter is a section of concrete pipe with a spigot end portion 13 provided with a metal ring or band 14 having a peripheral groove 15 that receives a resilient gasket or seal ring 18 of rubber, rubber-like material, or plastic. Such seal rings are usually circular in cross section as shown and possess elasticity and resiliency, are endless and, before placed on the pipe, are smaller than the pipe. The latter may be a type without a metal ring or band wherein the ring groove is formed in the concrete of the pipe. With the use of the machine or tractor 11, as will later appear, the seal ring is clamped at one point to the pipe as by any clamp 20, and threaded through the macshine, after which the machine is caused to travel circumferentially around the spigot portion of the pipe and serves to guide the ring into place into the groove 15. When the machine reaches the clamp 20, the latter is removed and the machine may be caused to make another revolution of the pipe to even out the tension in the ring, after which the machine is removed.

The device 11 comprises a chassis 22 having a main frame 23 and an auxiliary frame 24 pivotally mounted thereon. The main frame includes an elongated main member 26 shown as a box beam and extending laterally of this a plate 27 which is welded or otherwise secured thereto. The main frame also includes two upright posts, designated 28 and 29, respectively, one of which is supported by a gusset 30.

The auxiliary frame 24 is generally rectangular, being made up of two laterally spaced angle side members 32 and two tubular end members 33. A handle 34 is provided at each end. The auxiliary frame has depending apertured hinge plates 35 at one end joined by a cylinder 35' which receive a mounting pin 36 that is mounted in the post 28 of the main frame, whereby the auxiliary frame can be pivoted on the pin.

Near the other end of the auxiliary frame is a bridge or cross member 38 which supports a vertical tube 39 over a hole 40. An externally threaded stem 42 which is mounted on a pin 43 that is journaled in the post 29 of the main frame extends upwardly through the tube 39. A slip nut 43' with a handle 44' is applied to the stem above the tube 39 and a handle nut 44 is applied above this. With this construction, it is easy to loosen the slip nut and swing the frames apart sufficiently to permit the device to be installed on a pipe section or removed therefrom as will later appear.

The main frame carries a pair of eccentrically adjustable guide rollers 46 which are mounted on brackets 47 at the ends of member 26 and these are positioned to run in the peripheral groove 15 of the spigot portion of the pipe section. Preferably the main frame also has another roller, designated 48, which is carried on a bracket 49 at a laterally offset central section 50 of plate 27.

The auxiliary frame carries a motorized wheel 52 which preferably has a pneumatic tire 53 thereon. The wheel is rotatably mounted on a fixed shaft 54 which is mounted in blocks 55 carried on the side members 32 of the auxiliary frame. A sprocket wheel 57 is fixed to the wheel 52 and is driven by a chain 58 which extends around it and a smaller sprocket wheel 59 on the shaft of an air-driven motor 60 of any suitable type. The latter is mounted on the auxiliary frame beyond the tube 39. An electric motor might be used, if desired.

The main frame 23 is provided with guide means for the packing ring and this comprises a forward set of rollers 62, located laterally of the groove into which the seal ring is to be placed, and a rear tension guide means 63. The latter serves to guide the seal ring into the groove and at the same time grip it sufficiently to exert a pulling force or tension on the ring which it may be assumed has already been anchored as at 20. The guide rollers 62 include a pair of vertically spaced rollers 65 turning on horizontal axes and a lateral roller 66 turning on a vertical axis, all carried on a bracket 67. The guide means 63 includes a lead roller 70 having a vertical axis of rotation, a rear roller 71 having a horizontal axis of rotation, and, between these, a gripping means comprising a stationary bracket 73 providing a downwardly facing channel 74 and a plate 75 hingedly mounted at 76 thereon providing an opposing channel 77. Plate 75 is adjustably positioned with respect to channel 74 by means of a bolt 80 having a large, easily gripped circular handle 81. The bolt threads into a nut 82 on bracket 73 and carries a compression spring 84 positioned between the bracket 73 and plate 75.

Two guard rods are mounted on the outer side of the main frame and extend down and below the area which the seal ring travels in passing through the machine, these being designated 86 and 87, respectively.

In the operation of the machine the frames 23 and 24 of the chassis are separated sufficiently by loosening the slip nut 43' to permit the device to be installed on the spigot section of the pipe after which the slip nut is tightened so that the device is secured in place as shown in FIGS. 1, 2 and 4 of the drawing. The seal ring 18 is preferably endless and is secured, as by the clamp 20, just behind the machine. It is then threaded through the guide means 62 and 63 of the machine. The motor 60 is then connected by means of a hose 90 to a source of compressed air thus causing the device to travel circumferentially around the pipe, it being designed to move clockwise as viewed in FIG. 1. If an electric motor is used, it can be connected to a source of electrical energy by a suitable electric conductor. When the machine has nearly completed the revolution, clamp 20 is removed, and, preferably, the machine is allowed to make another complete revolution of the pipe in order to substantially equalize the tension in the sealing ring which normally has a substantially smaller diameter than the pipe. The machine is then removed from the pipe after loosening nut 43' and handle 81.

We claim:

1. A tractor for installing an elastic seal ring in the peripheral groove of the spigot of a large diameter pipe or the like, comprising a chassis, a first wheel means on the chassis for engaging the interior surface of the pipe spigot, a second wheel means on the chassis engageable with the peripheral surface of the pipe spigot, guide means carried by the chassis positioned to run in the groove of the spigot, motor means operably connected to drive one of said wheel means, and feed means for guiding the seal ring into the groove in the spigot as the tractor advances circumferentially around said spigot.

2. The tractor set forth in claim 1 in which said first wheel means is driven by said motor and comprises a wheel with a resilient tire.

3. The tractor set forth in claim 1 in which said first wheel means and said second wheel means are mounted for adjusted movement toward and away from each other, and in which means is provided for effecting such movement and holding the same in adjusted position.

4. The tractor set forth in claim 1 in which said guide means is formed by at least a part of said second wheel means.

5. The tractor set forth in claim 1 in which said chassis comprises a pair of frames pivotally connected at one end and means connecting the other ends of said frames for adjustably varying the spacing thereof, and in which said first wheel means is mounted on one of said frames and said second wheel means and guide means are mounted on the other of said frames.

6. A tractor for installing an elastic seal ring in the peripheral groove of a spigot end portion of a large diameter pipe or the like, comprising a main frame having rollers adapted to engage the periphery of the pipe spigot, an auxiliary frame pivotally mounted at one end on one end of said main frame, adjustable means connecting said frames adjacent their other ends whereby the spacing of said other ends of said frames can be adjustably varied, a motorized wheel means carried on said auxiliary frame for driving engagement with the inner surface of the pipe spigot, and feed means on said main frame for guiding the seal ring into the groove in the spigot as the tractor advances circumferentially around the spigot.

7. The tractor set forth in claim 6 in which the adjustable means connecting said frames comprises a threaded stem mounted at one end on the main frame and a nut on the stem supported by the auxiliary frame.

8. The tractor set forth in claim 6 in which the rollers of said main frame include two laterally spaced and aligned rollers constructed and arranged to run in the groove of the spigot end portion of the pipe.

9. The tractor set forth in claim 6 in which said motorized wheel means comprises a rubber-tired wheel, an air motor for driving the same, and a driving connection between the motor and the wheel, said wheel being substantially larger than said rollers.

10. The tractor set forth in claim 6 in which said feed means includes an adjustable jaw means through which the seal ring passes.

11. A tractor for installing an elastic seal ring in the peripheral groove of a spigot end portion of a large diameter pipe or the like, comprising a main frame having rollers adapted to engage the periphery of the pipe spigot, an auxiliary frame above the main frame, means pivotally connecting corresponding ends of said frames at one end thereof, means connecting the other ends of said frames for adjusted spacing thereof, said frames, the means pivotally connecting said frames and the means connecting the other ends of said frames being so constructed and arranged as to leave a substantial space between said frames unobstructed and open at one side thereof to receive a portion of the spigot end portion of the pipe, a motorized wheel means carried on said auxiliary frame for driving engagement with the inner surface of the pipe spigot, and feed means on said main frame for guiding the seal ring into the groove in the spigot as the tractor advances circumferentially around the spigot.

12. The tractor set forth in claim 11 in which said feed means includes an adjustable jaw means through which the seal ring passes.

References Cited

UNITED STATES PATENTS

| | | | |
|---|---|---|---|
| 3,200,482 | 8/1965 | Brown | 29—235 |
| 3,284,886 | 11/1966 | Provencher | 29—235 |
| 3,422,734 | 1/1969 | Tonjes | 29—235X |
| 3,505,725 | 4/1970 | Curry | 29—235X |

THERON E. CONDON, Primary Examiner

J. C. PETERS, Assistant Examiner